United States Patent [19]

Hartford

[11] Patent Number: 5,430,926
[45] Date of Patent: Jul. 11, 1995

[54] METHOD OF PRODUCING A ROTATABLE BRAKE COMPONENT AND BEARING ASSEMBLY

[75] Inventor: Dean J. Hartford, Wayne, Mich.

[73] Assignee: Kelsey-Hayes Company, Romulus, Mich.

[21] Appl. No.: 176,602

[22] Filed: Jan. 3, 1994

[51] Int. Cl.⁶ .......................................... B24B 1/00
[52] U.S. Cl. ............................. 29/434; 29/898.04; 29/402.01; 451/63; 451/290; 451/902
[58] Field of Search ............... 29/434, 402.01, 898.04, 29/898.062; 408/131; 188/18 A; 51/281 SF, 118, 132; 451/63, 254, 902, 290

[56] References Cited

U.S. PATENT DOCUMENTS

| | | | |
|---|---|---|---|
| 3,500,589 | 3/1970 | Ellege | 51/132 |
| 4,503,959 | 3/1985 | Flotow et al. | 451/63 X |
| 4,632,202 | 12/1986 | Narbut | 188/18 A |
| 4,766,702 | 8/1988 | Kinner | 51/132 |
| 5,125,156 | 6/1992 | Witte | 29/898.062 X |
| 5,381,630 | 1/1995 | Kinner | 451/63 |

Primary Examiner—Timothy V. Eley
Assistant Examiner—Khan V. Nguyen
Attorney, Agent, or Firm—MacMillan, Sobanski & Todd

[57] ABSTRACT

A method of producing a rotatable brake component and bearing assembly is disclosed wherein the brake friction surface of the brake component is oriented in a predetermined relationship relative to an inner race of a bearing unit. In accordance with this method, a rotatable brake component (e.g., a rotor or drum) defining an axis and including a brake friction surface and a hub portion having a cylindrical bore formed therein is provided. Next, the bore of the hub is machined. A bearing unit is then installed in the bore of the hub portion. The bearing unit includes an outer race which engages the bore and an inner race rotatably supported relative thereto. The brake component and bearing assembly is then supported on a machining apparatus by the inner race of the bearing unit. Using the machining apparatus, the brake friction surface is machined whereby the brake friction surface is oriented in a predetermined relationship relative to the inner race of the bearing unit.

11 Claims, 2 Drawing Sheets

METHOD OF PRODUCING A ROTATABLE BRAKE COMPONENT AND BEARING ASSEMBLY

BACKGROUND OF THE INVENTION

This invention relates in general to vehicle brakes and, in particular to, a method of producing a rotatable brake component and bearing assembly.

It is known to cast a rotatable brake component (e.g., a rotor or drum) with an integral hub portion. A conventional integral hub and rotor includes an axially extending hub, a radially extending mounting surface, and a radially extending outer disc which can be integrally cast as one-piece during a casting operation. The hub includes a centrally located bore formed therein, and a plurality of equally spaced lug bolt receiving holes are formed in the mounting surface circumferentially about the bore. The outer disc defines a pair of brake friction plates having opposed braking surfaces. The brake friction surfaces and the mounting surface are machined to be parallel to one another and perpendicular to the rotor axis.

When used with preassembled cartridge type of bearing units, a fully machined integral hub and rotor having preinstalled lug bolts is assembled and installed on a vehicle in the following manner. First, the cartridge bearing unit is installed in the bore of the hub of the rotor. The cartridge bearing unit can either be a pregreased sealed-for-life cartridge bearing, or of the type having a pair of bearing elements, either ball bearings or tapered roller bearings, disposed between an inner bearing race or cup and an outer bearing race or cup.

The rotor and bearing are then installed on a wheel spindle, and a nut is threaded onto the end of the spindle and tightened to pre-load the bearing assembly to predetermined specifications. Also, the nut functions to secure the rotor to the wheel spindle for rotation therewith. Next, the disc brake assembly, which includes a brake caliper slidably supported on a pair of pins, a pair of brake pads, and a hydraulically actuable piston, is secured via an anchor plate to a fixed part of a vehicle.

When fully assembled on the vehicle, the friction plates of the rotor are disposed adjacent the brake pads of the disc brake assembly and separated from engagement therewith by a predetermined normal brake running clearance when the piston is not actuated. During operation, when the piston of the disc brake assembly is hydraulically actuated, the brake shoes take up the normal running clearance and frictionally engage the friction plates.

In order to provide the normal brake running clearance, the rotor needs to be manufactured to tight specifications. In particular, the brake friction plate surfaces need to be oriented in a perpendicular relationship relative to the axis of the rotor, and in a parallel relationship relative to one another. If these tight specifications are not maintained in the friction plate surfaces, excessive lateral runout or excessive thickness variations in the friction plate surfaces of the rotor can occur which can lead to undesirable results. For example, premature or uneven wear of the brake pads can occur, or undesirable noise, vibration, or brake shudder caused by engagement of the brake pads with the friction plates when the brakes are not applied can occur.

When used with component type of bearings, it is known to assemble an integral hub and rotor by having the supplier initially finish machine the bore of the hub, and then rough machine the friction plates surfaces and the wheel mounting surface. Next, a pair of outer bearing cups are press fit into the hub bore. Then, the rotor and outer bearings cups are supported on a tool having an outer surface adapted to support the rotor relative to the outer bearing cups. Next, the brake friction plate surfaces, wheel mounting surface, and lug bolt holes are finish machined. Lug bolts are then press-fit or secured in the lug holes by retaining clips and the rotor is shipped to the assembly plant where the bearings elements and inner cups are installed. The rotor is then installed on a vehicle, and finally, the bearings are loaded to manufacturers specifications.

As a result of manufacturing an integral hub and rotor and bearing assembly in this manner, the finish machining of the friction plate surfaces, the wheel mounting surface, and the lug bolt holes are in a predetermined relationship relative to the location of the supplier installed outer bearing cups. However, after the bearing elements and the inner bearing cups are installed at the assembly plant, the location of the outer bearing races may have changed. Therefore, the runout and parallelism of the brake friction plates may be outside the desired specifications. Also, the wheel mounting surface may not be sufficiently parallel to the surfaces of the brake friction plates. In addition, there exists the possibility of the bearing elements not being properly greased, or not being properly loaded.

SUMMARY OF THE INVENTION

This invention relates to a method for producing a rotatable brake component and bearing assembly wherein the brake friction surface is oriented in a predetermined relationship relative to an inner race of a bearing unit. In accordance with this method, a rotatable brake component (e.g., a rotor or drum) defining an axis and including a brake friction surface and a hub portion having a cylindrical bore formed therein is provided. Next, the bore of the hub is machined. A bearing unit is then installed in the bore of the hub portion. The bearing unit includes an outer race which engages the bore and an inner race rotatably supported relative thereto. The brake component and bearing assembly is then supported on a machining apparatus by the inner race of the bearing unit. Using the machining apparatus, the brake friction surface (and optionally a mounting surface) are machined whereby these surfaces are oriented in a predetermined relationship relative to the inner race of the bearing unit. Preferably, the bearing is preloaded during the machining. As a result of producing the brake component and bearing assembly in this manner, tighter tolerances are maintained in the brake component and bearing assembly.

Other advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
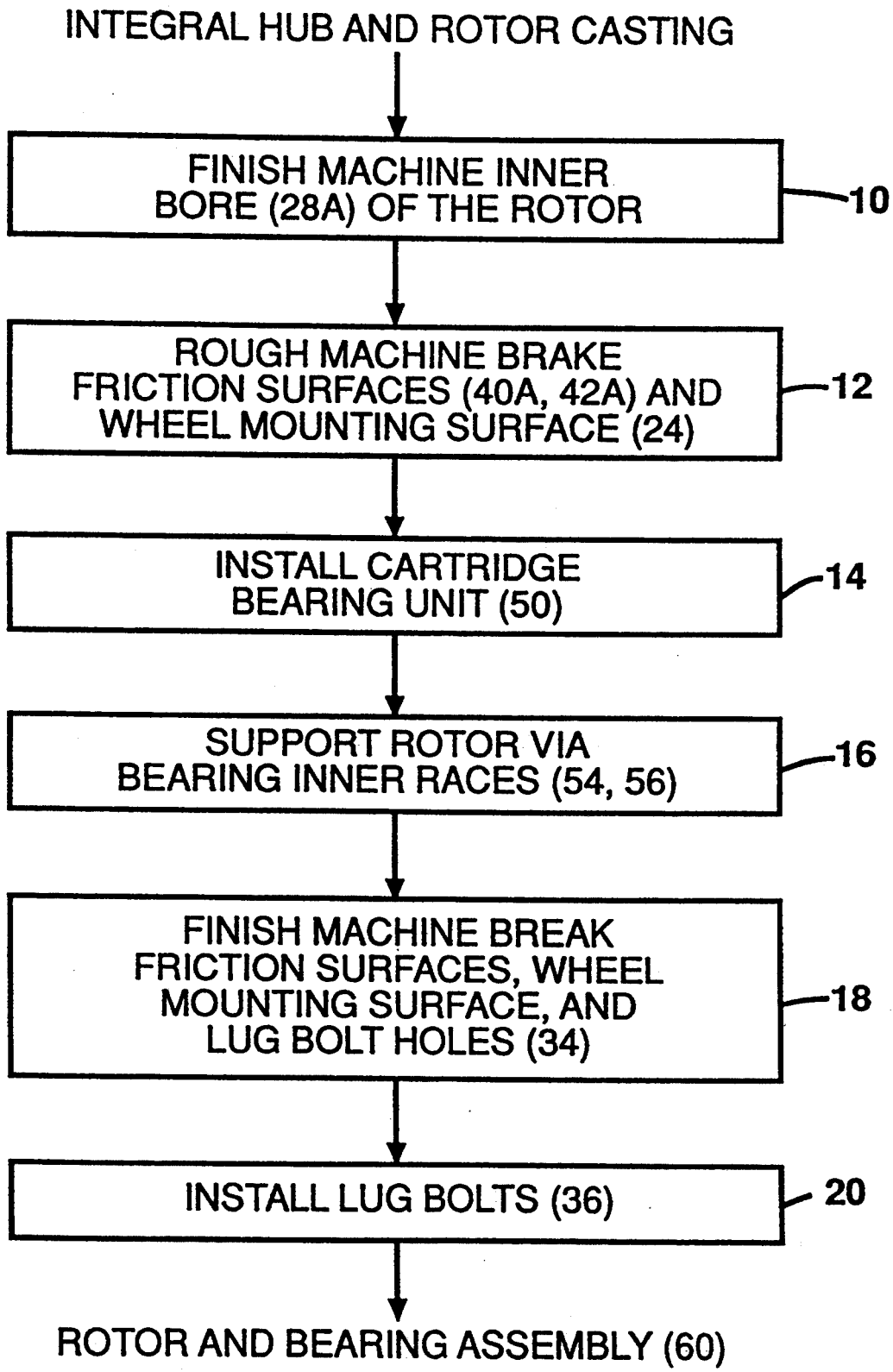
FIG. 1 flow diagram of a sequence of steps for producing a disc brake rotor and bearing assembly constructed in accordance with the present invention.
Figure 2:
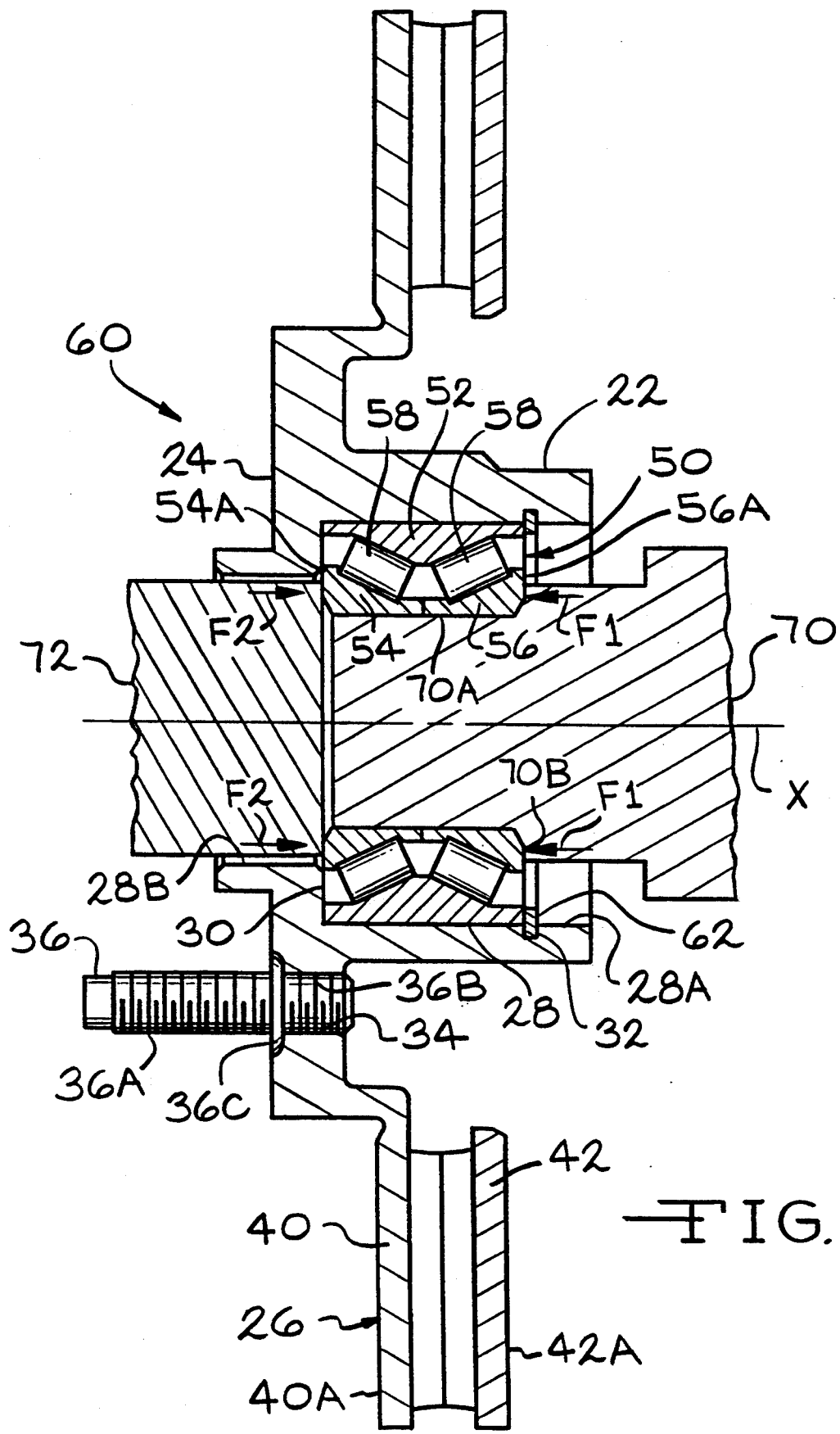
FIG. 2 is a cross sectional view of the disc brake rotor and bearing assembly produced according to the method of FIG. 1.

Referring now to the drawings, there is illustrated in FIG. 1 a sequence of steps for producing a disc brake rotor and bearing assembly, indicated generally at 60 in FIG. 2, and constructed in accordance with the present invention. As shown therein, the disc brake rotor and bearing assembly includes an axially extending hub 22, a radially extending mounting surface 24, and a radially extending outer disc 26. The outer disc 26 includes a pair of spaced apart brake friction plates 40 and 42 having opposed parallel brake friction surfaces 40A and 42A, respectively. The hub 22 is provided with a centrally located wheel spindle receiving bore 28 formed therein. The bore 28 is of a stepped configuration and includes a first cylindrical surface 28A, and a reduced second cylindrical surface 28B. A shoulder 30 is defined between the surfaces 28A and 28B. Also, an annular groove 32 is formed in the surface 28A of the bore 28 a predetermined distance from the shoulder 30.

In this embodiment, the disc brake rotor 60 further includes a plurality of equally spaced recessed threaded lug bolt receiving holes 34, only one hole 34 shown, formed in the mounting surface 24 circumferentially about the bore 28. A lug bolt 36 having first and second threaded ends 36A and 36B, respectively, and a flange 36C is threadably secured in each of the threaded holes 34 for mounting a wheel (not shown) on the rotor 60. A threaded lug nut (not shown) is installed on the end 36A of each lug bolt 36 and tightened to secure the wheel on the rotor. Also, as will be discussed, in this embodiment, the rotor preferably includes a pregreased sealed-for-life cartridge bearing unit 50 installed in the bore 28 of the hub 22.

The cartridge bearing unit 50 includes an outer race 52, a pair of inner races 54 and 56, and a pair of bearings 58, shown in this embodiment as a pair of tapered roller bearings 58, installed between the inner and outer races. The cartridge bearing unit 50 can be a Model No. B-73660 cartridge bearing unit manufactured by The Timken Company of Canton, Ohio, and is preferred over other kinds of bearing units since it is a pregreased sealed-for-life bearing unit. Also, a retaining ring 62 is installed in the annular groove 32 of the rotor 60 to positively retain the bearing unit 50 therein. The retaining ring 62 ensures that the bearing unit 50 will not shift from its installed position.

Turning now to FIG. 1, the method for producing the disc brake rotor and bearing assembly 60 will be discussed. Initially, an integral hub and rotor casting (not shown) formed form a suitable material, such as for example, cast iron or aluminum, is provided. In step 10, the inner bore 28 of the rotor casting is finish machined. Next, the brake friction surfaces 40A and 42A and the wheel mounting surface 24 are rough machined in step 12. Following step 12, the cartridge bearing unit 50 is installed in the bore 28 during step 14. Also, during step 14, the retaining ring 62 is installed in the groove 32 provided in the bore surface 28A to positively retain the cartridge bearing unit 50 therein.

Following step 14, the disc brake rotor 60 having the cartridge bearing unit 50 installed therein is supported via the inner races 54 and 56 on suitable tooling, such as, for example, a collet 70 and a tailstock 72 as shown in FIG. 2 during step 16. In particular, in this embodiment, a reduced diameter end 70A of collet 70 engages the inner races 54 and 56, and a shoulder 70B of collet 70 engages an end surface 56A of inner race 56. The tailstock 72 is operative to apply an axial force F1 against an end surface 54A of inner race 54. As a result of supporting the rotor and bearing assembly in this manner, the collet 70 and the tailstock 72 are operative to take out the "bench end play" in the bearing unit 50 and also preload the cartridge bearing unit 50. Bench end play as used herein is defined as the normal tolerances that exist in an assembled unloaded bearing unit, and preload is defined as simulating mounting of the rotor and bearing assembly on the vehicle.

Once the disc brake rotor and bearing assembly 60 is supported on the collet 70 and the tailstock 72 by the inner races 54 and 56, the precise axis X of the rotor and bearing assembly 60 is determined relative to the inner races 54 and 56. Then, other tooling (not shown) is operative to rotate the rotor so that cutting tools (not shown) can finish machine the brake friction surfaces 40A and 42A, the wheel mounting surface 24, and the lug bolt holes 34 during step 18 in a predetermined relationship relative to the axis X of the rotor and bearing assembly 60 which is determined by the location of the inner races 54 and 56. In particular, the finish machined brake friction surfaces 40A and 42A and the wheel mounting surface 24 are oriented parallel to each another and perpendicular to the inner races 54 and 56, and the lug bolt holes 34 are oriented parallel to the inner races 54 and 56.

Also, as shown in this embodiment, suitable tapping tools (not shown) are provided for threading the lug bolt holes 34 during step 18. As will be discussed below, since the finish machining of step 18 is accomplished after the rotor and bearing assembly 60 is supported relative to the inner races 54 and 56 of the installed cartridge bearing unit 50, tighter tolerances can be maintained. Finally, in step 20, the threaded ends 36B of the lug bolts 36 are threadably secured in the threaded lug bolt holes 34 to produce the disc brake rotor and bearing assembly 60.

One advantage of the present invention is that the finish machining of the opposed brake friction surfaces 40A and 42A, the wheel mounting surface 24, and the lug bolt holes 34 is done after the cartridge bearing unit 50 is installed in the bore 28 of the rotor 60 and the entire assembly is supported relative to the inner races 54 and 56 and preloaded. As a result of this, the finish machining of the brake friction surfaces 40A and 42A can be held to tight tolerances since the machining is dependent upon the precise orientation of the installed cartridge bearing unit 50, and in particular, the precise orientation of the inner races 54 and 56 of the cartridge bearing unit 50.

In the prior art, the finish machining occurred prior to the complete installation of a bearing unit for that particular rotor. Thus, depending upon the actual orientation of the inner races of the particular bearing unit which is selected to be installed in the bore (which is determined by the actual bearing unit which is selected to be installed, and also by the orientation of the unit after the bench play is taken out and the bearing is preloaded), the tolerances can be different from those which were machined prior to the installation of the bearing unit. Even in instances where the rotor and outer bearing races are supported on tooling relative to the outer bearing races and the finish machining is in a predetermined relationship relative to the outer bearing races, the orientation of outer bearing races in the fully assembled rotor and bearing assembly may have changed.

Another advantage of the present invention is that the disc brake rotor and bearing assembly 60 can be installed on a vehicle by inserting the wheel spindle through the bore 28 of the rotor and bearing assembly 60. Thus, at the place of installation of the rotor and bearing assembly 60 on the wheel spindle of the vehicle, less time is required to install the rotor and bearing assembly 60 of the present invention compared to the amount of time required to both assemble and install the prior art rotor and bearing assembly on a vehicle, wherein at least some of the individual bearing components had to be installed after installing the rotor on the vehicle.

In addition, the rotor and bearing assembly 60 of the present invention requires installation of one fully assembled rotor and bearing assembly 60 on the vehicle compared to the prior art method wherein a plurality of component parts needed to be installed on the vehicle to produce the finished rotor and bearing assembly. As a result of this, the possibility of incorrect assembly and installation of the rotor and bearing assembly 60 of the present invention on the vehicle is minimized. Also, since the rotor and bearing assembly 60 of the present invention is shipped to the assembly plant ready to be installed on a vehicle, less inventory space is needed, and assembly line down time due to a shortage of one or more individual component parts will no longer occur.

A further advantage of the present invention is that the lug bolts 36 are threadably received in threaded lug holes 34. As a result of this, the bolts 36 allow for tighter packaging requirements compared to a prior art bolt (not shown) having a head. Also, the ends 36B of the bolts 36 are preferably coated with a material (not shown), such as for example, LOCKTITE TM, to further secure the bolts 36 in the holes 34.

While this invention has been described and illustrated as producing a disc brake rotor and bearing assembly 60, the invention can be practiced to produce a brake drum and bearing assembly (not shown) wherein the brake drum includes an integral hub. When so practiced, the machining of step 18 is operative to orient an inner cylindrical brake friction surface and a plurality of lug bolt holes concentric with one another and the inner races of the bearing unit, and a drum mounting surface perpendicular to the axis of the bearing inner races.

Also, while this invention has been described and illustrated as forming the rotor and bearing assembly 60 with a pregreased sealed-for-life cartridge bearing unit 50, other types of bearing units (not shown) can be used in accordance with the teachings of the present invention. For instance, a component type of bearing unit including a pair of bearing elements, either ball bearings or tapered roller bearing installed between an inner race and an outer race can be used. In addition, while the invention has been described and illustrated as preferably providing threaded holes 34 in the rotor for threadably receiving threaded ends 36B of lug bolts 36, other hole/bolt arrangements can be used. For example, a nonthreaded hole (not shown) can be formed in the rotor, and press-fit bolts (not shown) can be installed the nonthreaded holes, or nonthreaded bolts (not shown) can secured in nonthreaded holes by retaining clips (not shown).

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed:

1. A method for producing a brake component and bearing assembly comprising the steps of:
    (a) providing a rotatable brake component defining an axis and including a brake friction surface and a hub portion having a cylindrical bore formed therein;
    (b) machining the bore of the hub portion;
    (c) installing a bearing unit in the machined bore of the hub portion, the bearing unit including an outer race engaging the bore and inner race rotatably supported relative thereto;
    (d) supporting the brake component and bearing assembly on a machining apparatus by means of the inner race; and
    (e) using the machining apparatus to machine the brake friction surface whereby the brake friction surface is oriented in a predetermined relationship relative to the inner race of the bearing unit.

2. The method according to claim 1 wherein the brake component includes a mounting surface and step (e) includes using the machining apparatus to machine the mounting surface of the brake component whereby the mounting surface is oriented in a predetermined relationship relative to the inner race of the bearing unit.

3. The method according to claim 1 wherein the step (d) includes preloading the bearing unit.

4. The method according to claim 1 wherein the brake component includes a mounting surface and step (e) includes using the machining apparatus to machine a plurality of lug bolt receiving holes in the mounting surface whereby the lug bolt receiving holes are oriented in a predetermined relationship relative to the inner race of the bearing unit.

5. The method according to claim 4 wherein the lug bolt receiving holes are threaded and further including securing a threaded lug bolt in each of the threaded lug bolt receiving holes.

6. The method according to claim 1 wherein step (a) includes providing a disc brake rotor having an outer disc portion defining a pair of opposed parallel brake friction surfaces, and step (e) includes using the machining apparatus to machine the brake friction surfaces whereby the brake friction surfaces are oriented in a predetermined relationship relative to the inner race of the bearing unit.

7. The method according to claim 6 wherein the rotor includes a mounting surface parallel to the brake friction surfaces, and step (e) includes using the machining apparatus to machine the mounting surface of the rotor whereby the mounting surface is oriented in a predetermined relationship relative to the inner race of the bearing unit.

8. A disc brake rotor and bearing assembly produced according to the method of claim 1.

9. The method according to claim 1 wherein step (a) includes providing a brake drum having an inner cylindrical brake friction surface, and step (e) includes using the machining apparatus to machine the brake friction surface whereby the brake friction surface is oriented in a predetermined relationship relative to the inner race of the bearing unit.

10. The method according to claim 9 wherein the brake drum includes a mounting surface perpendicular to the brake friction surface, and step (e) includes using the machining apparatus to machine the mounting surface of the brake drum whereby the mounting surface is oriented in a predetermined relationship relative to the inner race of the bearing unit.

11. A brake drum and bearing assembly produced according to the method of claim 1.

* * * * *